US011674588B2

(12) United States Patent
    Fukasawa et al.

(10) Patent No.: US 11,674,588 B2
(45) Date of Patent: Jun. 13, 2023

(54) DIFFERENTIAL CASE

(71) Applicant: HITACHI ASTEMO, LTD., Hitachinaka (JP)

(72) Inventors: Kenji Fukasawa, Hitachinaka (JP); Fumio Ohshima, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 4 days.

(21) Appl. No.: 17/200,121

(22) PCT Filed: Jul. 5, 2019

(86) PCT No.: PCT/JP2019/026805
    § 371 (c)(1),
    (2) Date: Mar. 12, 2021

(87) PCT Pub. No.: WO2020/246046
    PCT Pub. Date: Dec. 10, 2020

(65) Prior Publication Data
    US 2022/0349464 A1    Nov. 3, 2022

(30) Foreign Application Priority Data

Jun. 6, 2019    (JP) .............................. JP2019-106038

(51) Int. Cl.
    *F16H 48/40*    (2012.01)
    *F16H 57/037*   (2012.01)
    *F16H 57/04*    (2010.01)

(52) U.S. Cl.
    CPC ....... *F16H 57/037* (2013.01); *F16H 57/0424* (2013.01); *F16H 57/0483* (2013.01); *F16H 2700/00* (2013.01)

(58) Field of Classification Search
    CPC ........ F16H 48/40; F16H 57/04; F16H 57/034; F16H 57/0424; F16H 57/0483; F16H 2700/00
    (Continued)

(56) References Cited

U.S. PATENT DOCUMENTS 5,735,765 A * 4/1998 Teraoka ............... F16H 57/0483
                                                        475/248
7,867,126 B2 * 1/2011 Nakajima ........... F16H 57/0483
                                                        475/160
(Continued)

FOREIGN PATENT DOCUMENTS

JP    2008-082544 A    4/2008
JP    2010-038209 A    2/2010
(Continued)

OTHER PUBLICATIONS

International Search Report dated Aug. 6, 2019 for the corresponding PCT International Patent Application No. PCT/JP2019/026805.
(Continued)

*Primary Examiner* — Leslie A Nicholson, III
(74) *Attorney, Agent, or Firm* — Leason Ellis LLP; Edward J. Ellis; Melvin C. Garner

(57) ABSTRACT

A differential case includes an outer shell wall portion configured to accommodate a pinion gear therein, and a first groove is formed in an inner surface of the outer shell wall portion on a back surface side of the pinion gear. In addition, a convex portion is formed on the inner surface of the outer shell wall portion on the back surface side of the pinion gear, and the first groove is formed in the convex portion. Further, a diameter of the convex portion is equal to or larger than a diameter of a back surface of the pinion gear.

20 Claims, 12 Drawing Sheets

(58) Field of Classification Search
USPC .......................................................... 475/252
See application file for complete search history.

(56) References Cited

U.S. PATENT DOCUMENTS

| | | | | |
|---|---|---|---|---|
| 7,976,421 | B2* | 7/2011 | Nakajima | F16H 57/0483 |
| | | | | 475/160 |
| 9,587,730 | B2* | 3/2017 | Mori | F16H 57/0483 |
| 10,309,521 | B2* | 6/2019 | Takuno | F16H 57/0483 |
| 10,527,153 | B2* | 1/2020 | Okumoto | F16H 57/0483 |
| 10,663,055 | B2* | 5/2020 | Nakamura | F16H 57/0427 |
| 11,391,354 | B2* | 7/2022 | Fukasawa | F16H 48/08 |
| 2008/0051245 | A1 | 2/2008 | Nakajima et al. | |
| 2019/0003571 | A1 | 1/2019 | Okumoto et al. | |
| 2019/0170241 | A1* | 6/2019 | Nakamura | F16H 57/0483 |

FOREIGN PATENT DOCUMENTS

| | | |
|---|---|---|
| JP | 2013-087888 A | 5/2013 |
| JP | 2019-011849 A | 1/2019 |

OTHER PUBLICATIONS

Written Opinion dated Aug. 6, 2019 for the corresponding PCT International Patent Application No. PCT/JP2019/026805.

\* cited by examiner

FIG.7
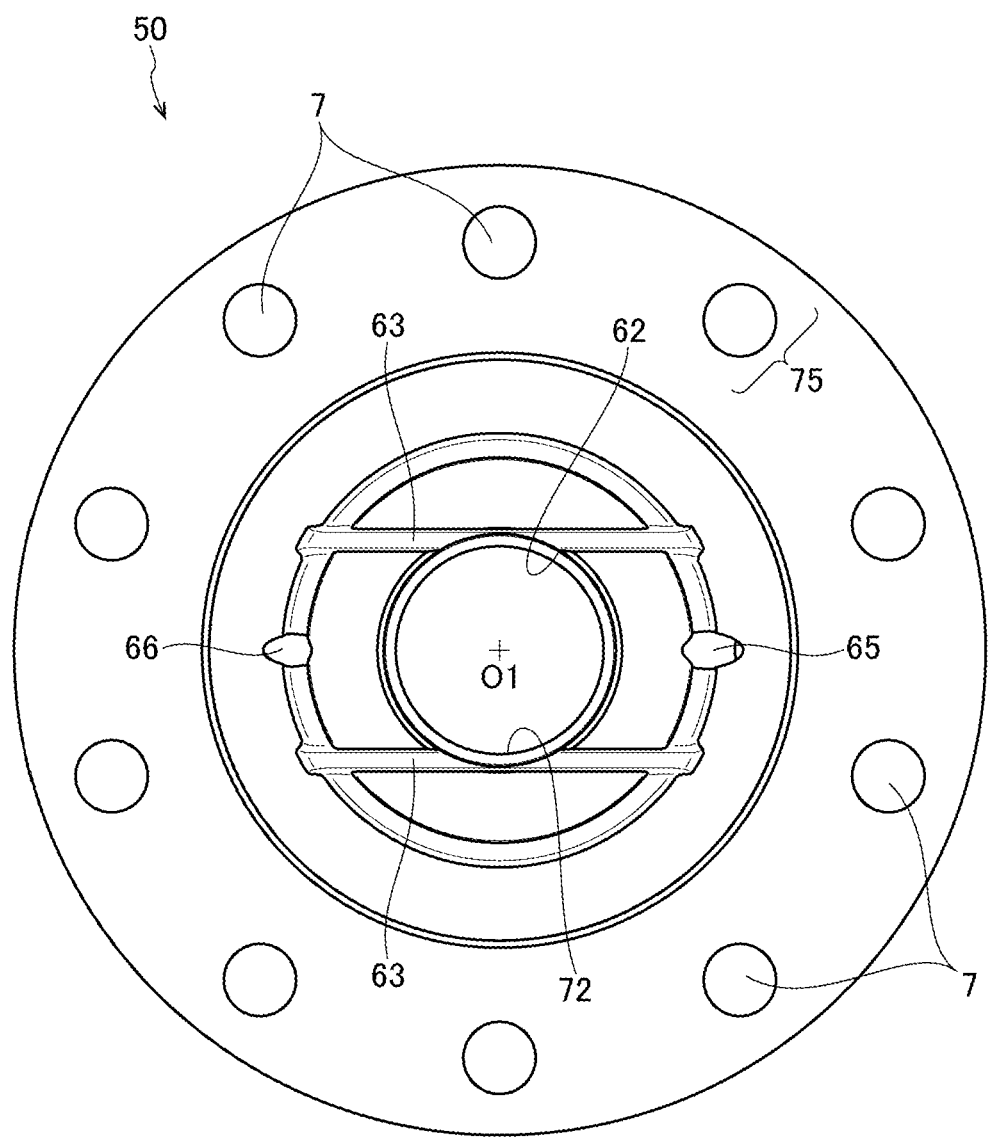
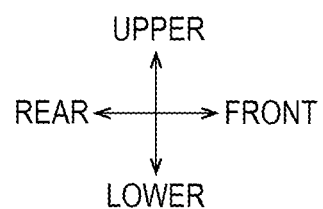

DIFFERENTIAL CASE

CROSS REFERENCE TO RELATED APPLICATION(S)

This application is a Continuation of PCT Application No. PCT/JP2019/026805 filed on Jul. 5, 2019, which claims benefit of the priority to Japanese Application No. 2019-106038 filed on Jun. 6, 2019, the contents of which are incorporated herein by reference in their entireties.

FIELD OF THE INVENTION

The present invention relates to a differential case.

BACKGROUND OF THE INVENTION

A vehicle such as a four-wheeled vehicle or a three-wheeled vehicle includes a differential device that differentially rotates a left wheel and a right wheel (see Patent Literature 1). The differential device includes two side gears, two pinion gears and a spherical shell-shaped differential case that accommodates the gears.

Patent Literature 1: JP-A-2013-87888

That is, Patent Literature 1 discloses a differential case that accommodates two side gears and two pinion gears. When the left wheel and the right wheel rotate differentially, the side gears and the pinion gears rotate at a high speed with respect to the differential case. Since the side gears or the like rotate at the high speed with respect to the differential case in this way, it is desired that a sliding contact portion between a back surface of each of the side gears or the like and an inner surface of the differential case is favorably lubricated with a lubricant.

SUMMARY OF THE INVENTION

Therefore, the present invention has been made to improve this, and an object of the present invention is to provide a differential case capable of favorably lubricating a sliding contact portion.

As a means for solving the above-mentioned problems, the present invention provides a differential case including an outer shell wall portion that accommodates a gear therein, and a groove is formed in an inner surface of the outer shell wall portion on a back surface side of the gear.

According to such a configuration, since the groove is formed in the inner surface of the outer shell wall portion on the back surface side of the gear, a lubricant in the outer shell wall portion is easily guided to the back surface side of the gear through the groove. In this way, since the lubricant is guided to the back surface side of the gear, a sliding contact portion (a contact portion between the gear and the differential case) on the back surface side of the gear can be favorably lubricated.

Advantageous Effects of Invention

According to the present invention, a differential case capable of favorably lubricating a sliding contact portion can be provided.

BRIEF DESCRIPTION OF THE DRAWINGS

FIG. 7 is a right side view of a differential case lid according to the first embodiment.

DETAILED DESCRIPTION OF THE INVENTION

First Embodiment

A first embodiment of the present invention will be described with reference to FIG. 1 to 9. Here, a configuration in which a differential case according to the present invention is incorporated in a power transmission device on a rear wheel side of a three-wheeled vehicle (a vehicle) will be described as an example. The vehicle is not limited to the three-wheeled vehicle, and may be a four-wheeled vehicle, for example. In addition, "front, rear, left, right, upper and lower" shown in FIG. 1 to 9 are used as references.

[Power Transmission Device]

Figure 1:
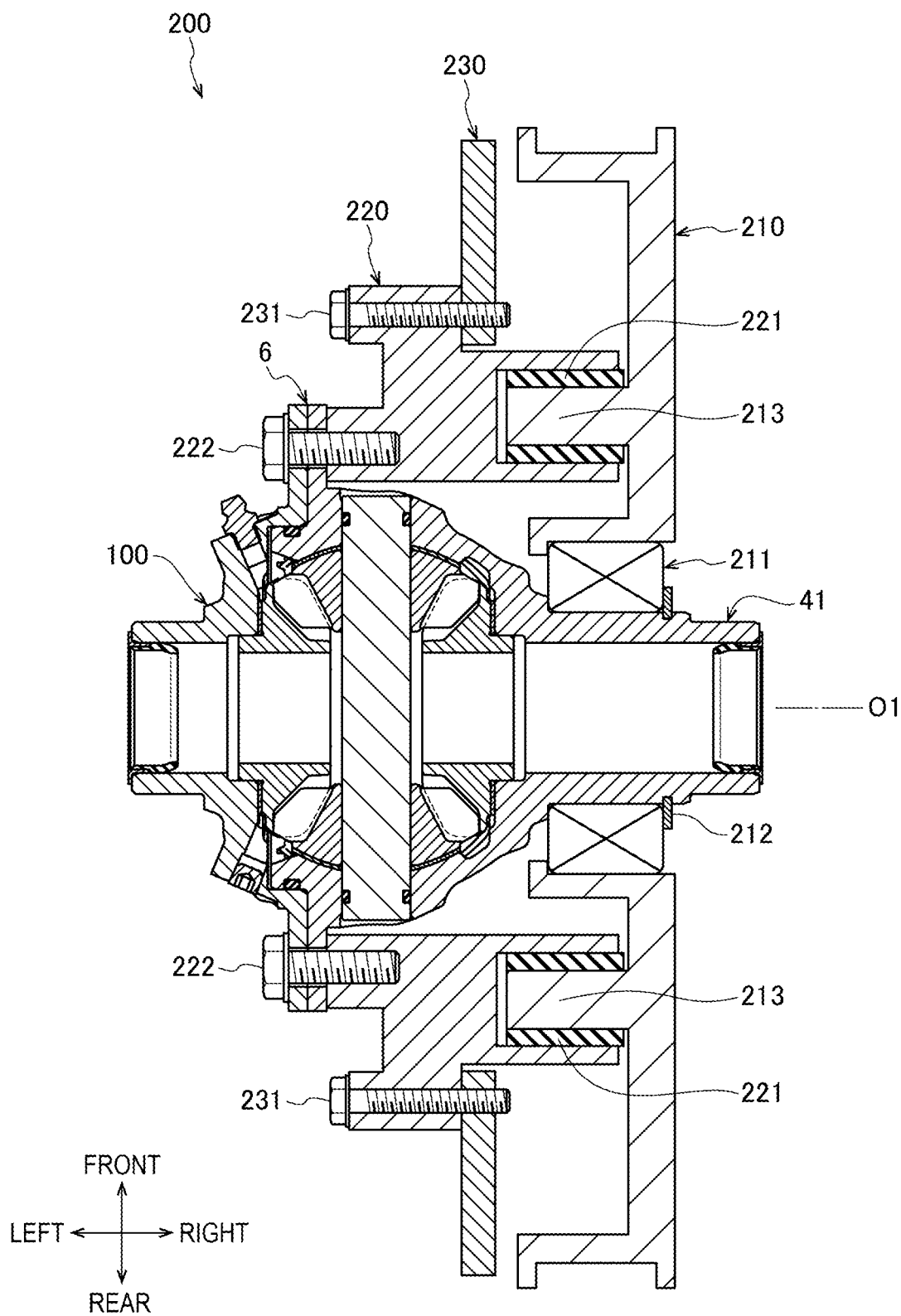
FIG. 1 is a plan sectional view of a power transmission device on a rear wheel side of a three-wheeled vehicle according to a first embodiment.

As shown in FIG. 1, a power transmission device 200 according to the first embodiment is a device that transmits power transmitted from an engine (not shown) on a front side of the vehicle via a belt (not shown) to a left rear wheel and a right rear wheel (not shown) to differentially rotate the left rear wheel and the right rear wheel. Tread widths of the left rear wheel and the right rear wheel are 1.5 to 2.0 m, for example, but the three-wheeled vehicle can smoothly travel on a curve or the like by differential rotation of the left rear wheel and the right rear wheel.

The power transmission device 200 includes a driven pulley 210, a holder 220, a back gear 230 and a differential device 100.

The driven pulley 210 has a ring shape and is rotatably attached to a right boss portion 41 via a radial bearing 211. The radial bearing 211 is fitted onto the right boss portion 41 and is axially positioned by a clip 212. A belt (not shown) is wound around the driven pulley 210, and power from a drive pulley (not shown) is transmitted to the driven pulley 210. On a left side of the driven pulley 210, a plurality of (for example, four) boss portions 213 are formed to protrude at an equal interval in a circumferential direction.

The holder 220 has a ring shape, and the plurality of boss portions 213 are inserted into a right side of the holder 220. A cylindrical bush 221 is interposed between the holder 220 and the boss portion 213. The holder 220 is fastened to a flange portion 6 of a differential case 1 by bolts 222.

Thereby, the driven pulley 210, the holder 220 and the differential case 1 rotate integrally.

The back gear 230 has a ring shape and is fastened to the holder 220 by bolts 231. During backward movement, a counter gear (not shown) enables power transmission between an output gear of a backward movement motor (not shown) and the back gear 230, and the back gear 230 and the differential case 1 rotate in a reverse direction corresponding to a backward movement direction by a driving force of the backward movement motor.

[Differential Device]

Figure 2:
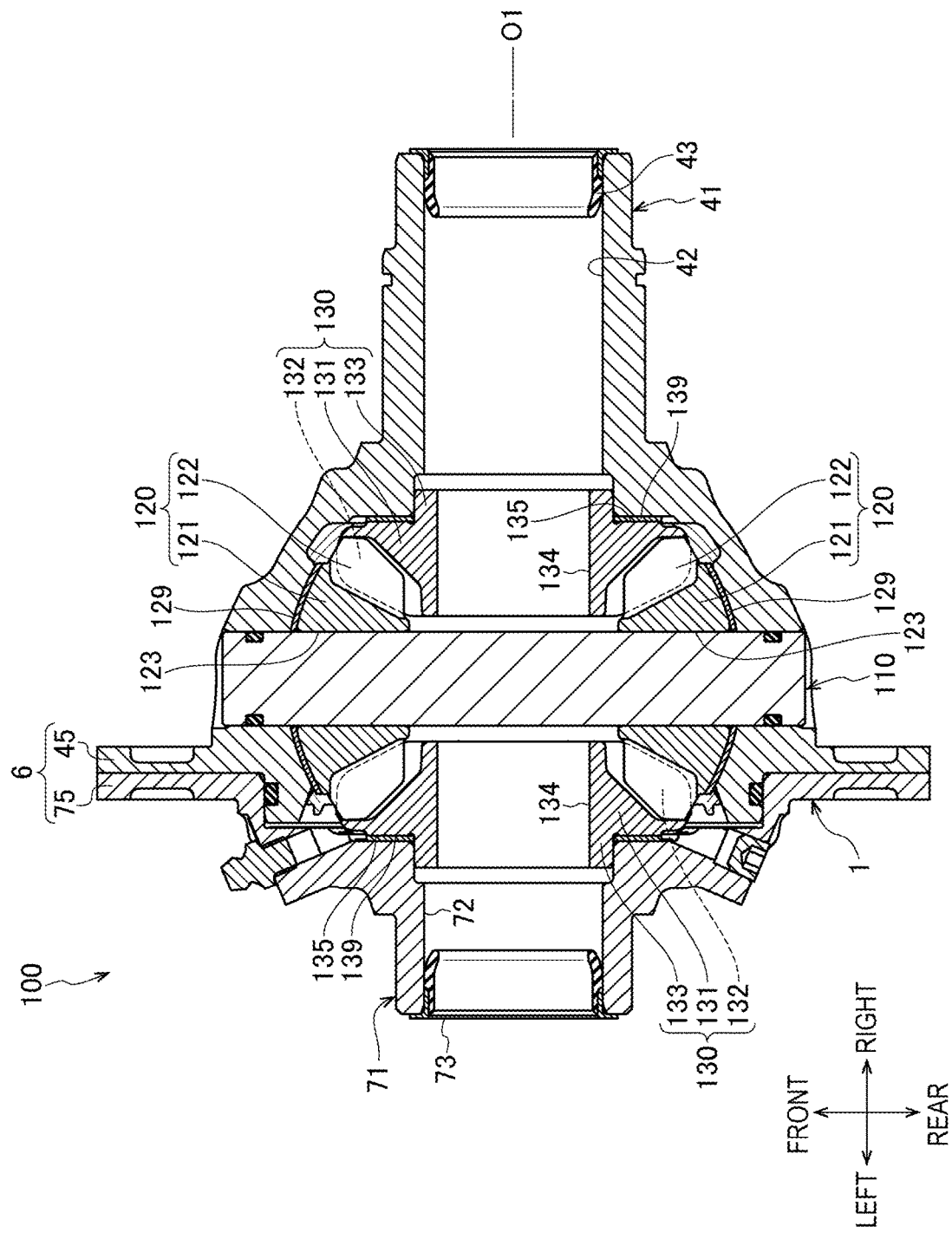
FIG. 2 is a plan sectional view of a differential device according to the first embodiment.

As shown in FIG. 2, the differential device 100 is a device that transmits the power from the holder 220 to the left rear wheel and the right rear wheel (not shown) to differentially rotate the left rear wheel and the right rear wheel. The differential device 100 includes a pinion shaft 110, two pinion gears 120, two side gears 130 and the differential case 1. The differential case 1 rotates about an axis O1 extending in a left-right direction.

Both end portions of the pinion shaft 110 are inserted into insertion holes 21 of the differential case 1. The pinion shaft 110 rotates integrally with the differential case 1.

The pinion gear 120 is a gear that rotates about the pinion shaft 110. The pinion gear 120 includes a truncated cone-shaped pinion gear main body 121 and pinion gear teeth 122 formed on an outer peripheral surface of the pinion gear main body 121. An insertion hole 123 through which the pinion shaft 110 is inserted is formed on an axis of the pinion gear main body 121.

A back surface 124 (see FIG. 5) of the pinion gear main body 121 is a convex curved surface that protrudes radially outward. A thrust bearing 129 having a thin plate curved shape is interposed between the pinion gear main body 121 and the differential case 1. The back surface 124 has a ring shape as viewed inward and is a sliding contact portion that is in sliding contact with the thrust bearing 129.

The side gear 130 is disposed so as to sandwich the pinion gear 120 in the left-right direction. The side gear 130 includes a truncated cone-shaped side gear main body 131, side gear teeth 132 formed on an outer peripheral surface of the side gear main body 131, and a short cylindrical shaft portion 133 formed to protrude to a back surface side of the side gear main body 131. The side gear teeth 132 mesh with the pinion gear teeth 122. The shaft portion 133 is rotatably inserted into a stepped hole 32 or a stepped hole 62 (see FIG. 3) described later.

A hole spline 134 having a spline groove formed on an inner peripheral surface thereof is formed on an axis of the side gear 130. The hole spline 134 is a hole through which drive shafts extending from the left rear wheel and the right rear wheel are spline-coupled. A thrust bearing 139 having a thin plate shape is interposed between the side gear main body 131 and the differential case 1. A back surface 135 of the side gear main body 131 has a ring shape as viewed radially inward and is a sliding contact portion that is in sliding contact with the thrust bearing 139.

When the two pinion gears 120 rotate about the pinion shaft 110, the two side gears 130 rotate, and the left rear wheel and the right rear wheel rotate differentially.

[Configuration of Differential Case]

The differential case 1 will be described in detail with reference to FIG. 3 to 9.

The differential case 1 is an outer shell container that accommodates the pinion shaft 110, the pinion gears 120 and the side gears 130 and constitutes a framework of the differential device 100. Here, the differential case 1 is formed of a cast product.

The differential case 1 includes a spherical outer shell wall portion 5 that accommodates the pinion gears 120, the side gears 130 and the like therein, the cylindrical right boss portion 41 extending rightward from the outer shell wall portion 5, a cylindrical left boss portion 71 extending leftward from the outer shell wall portion 5, and the ring-shaped flange portion 6 extending radially outward from the outer shell wall portion 5.

A plurality of bolt holes 7 through which the bolts 222 (see FIG. 1) are inserted are formed in the flange portion 6. The differential case 1 includes a differential case main body 10 and a differential case lid 50, and is formed of two pieces. The differential case 1 has a sealed shape in which a lubricant therein is sealed so as not to flow out to outside. The lubricant includes a lubricant that lubricates contact surfaces of components constituting the differential device 100, such as oil and grease.

<Differential Case Main Body>

The differential case main body 10 includes a hemispherical shell-shaped portion 20 having a bottom portion on a right side, the cylindrical right boss portion 41 extending rightward from the bottom portion of the hemispherical shell-shaped portion 20, and a ring-shaped right flange portion 45 extending radially outward from a left outer peripheral surface of the hemispherical shell-shaped portion 20.

<Differential Case Main Body: Hemispherical Shell-Shaped Portion>

An inner surface of the hemispherical shell-shaped portion 20 is substantially a spherical surface. The two insertion holes 21 facing each other with the axis O1 as a center are formed in a diameter direction extending in a front-rear direction through a center of the hemispherical shell-shaped portion 20. The insertion hole 21 is a hole into which both end portions of the pinion shaft 110 are inserted to be fixed.

Figure 3:
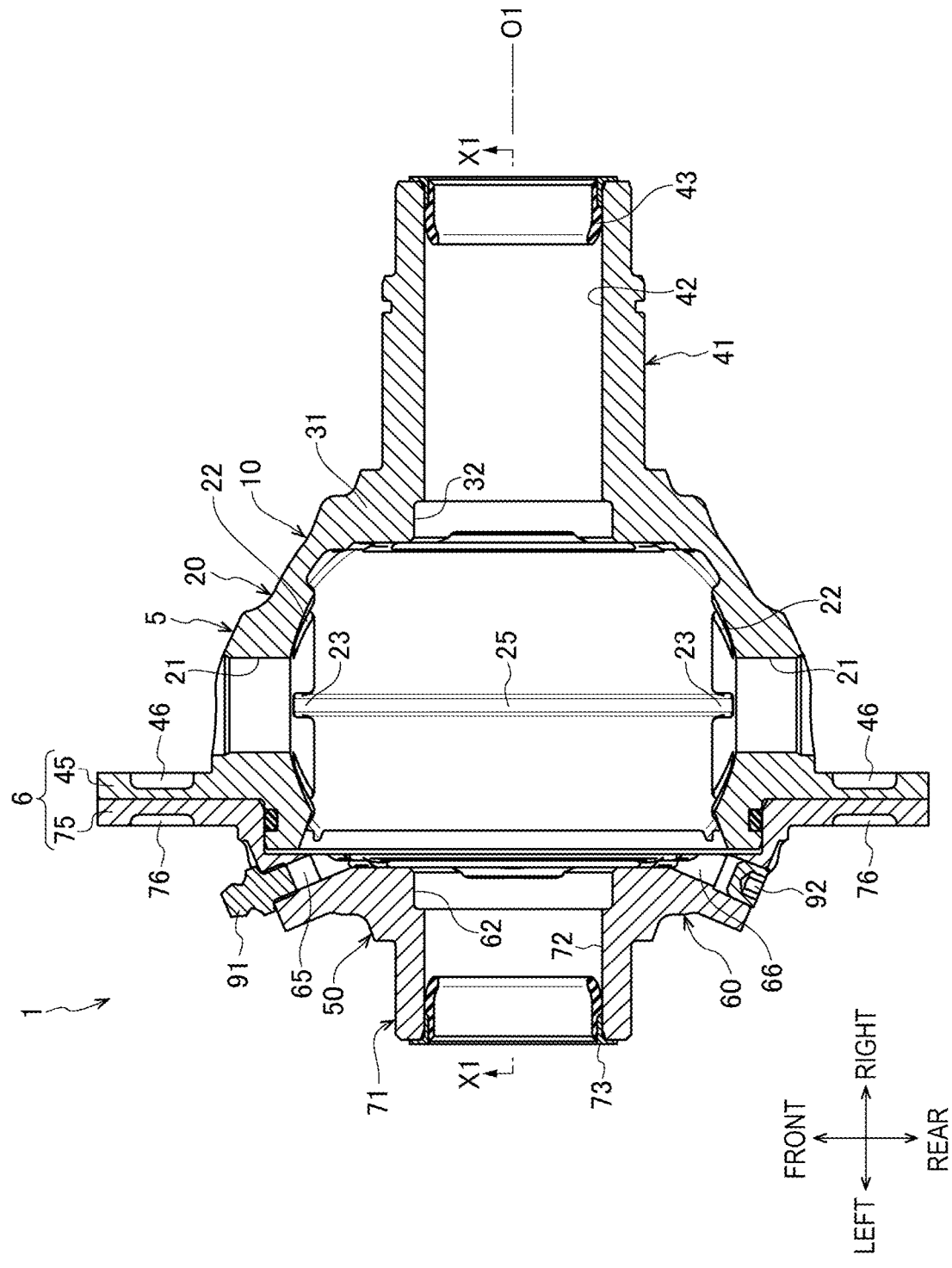
FIG. 3 is a plan sectional view of a differential case according to the first embodiment.
Figure 4:
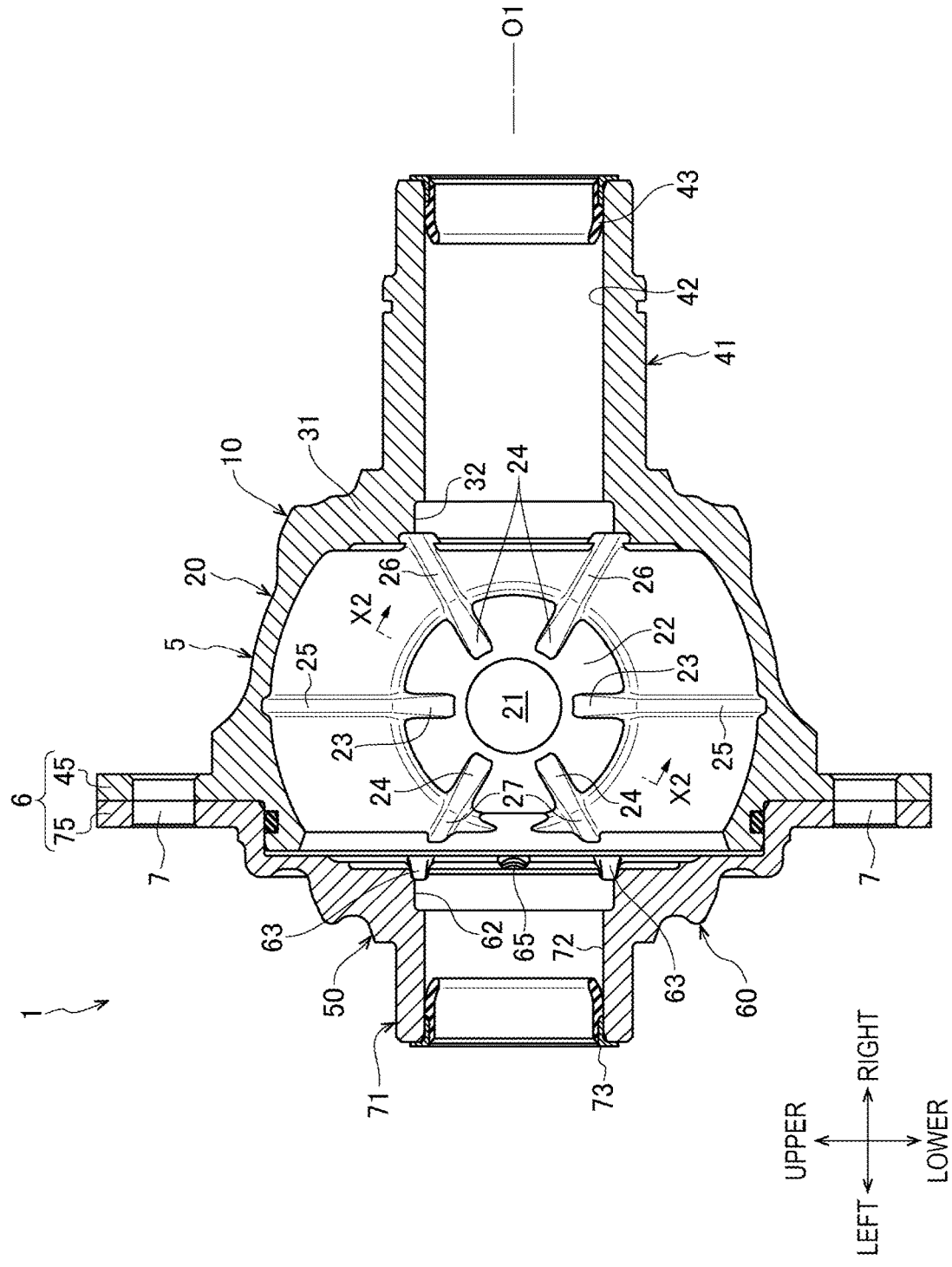
FIG. 4 is a vertical sectional view (a sectional view taken along a line X1-X1 in FIG. 3) of the differential case according to the first embodiment.
Figure 5:
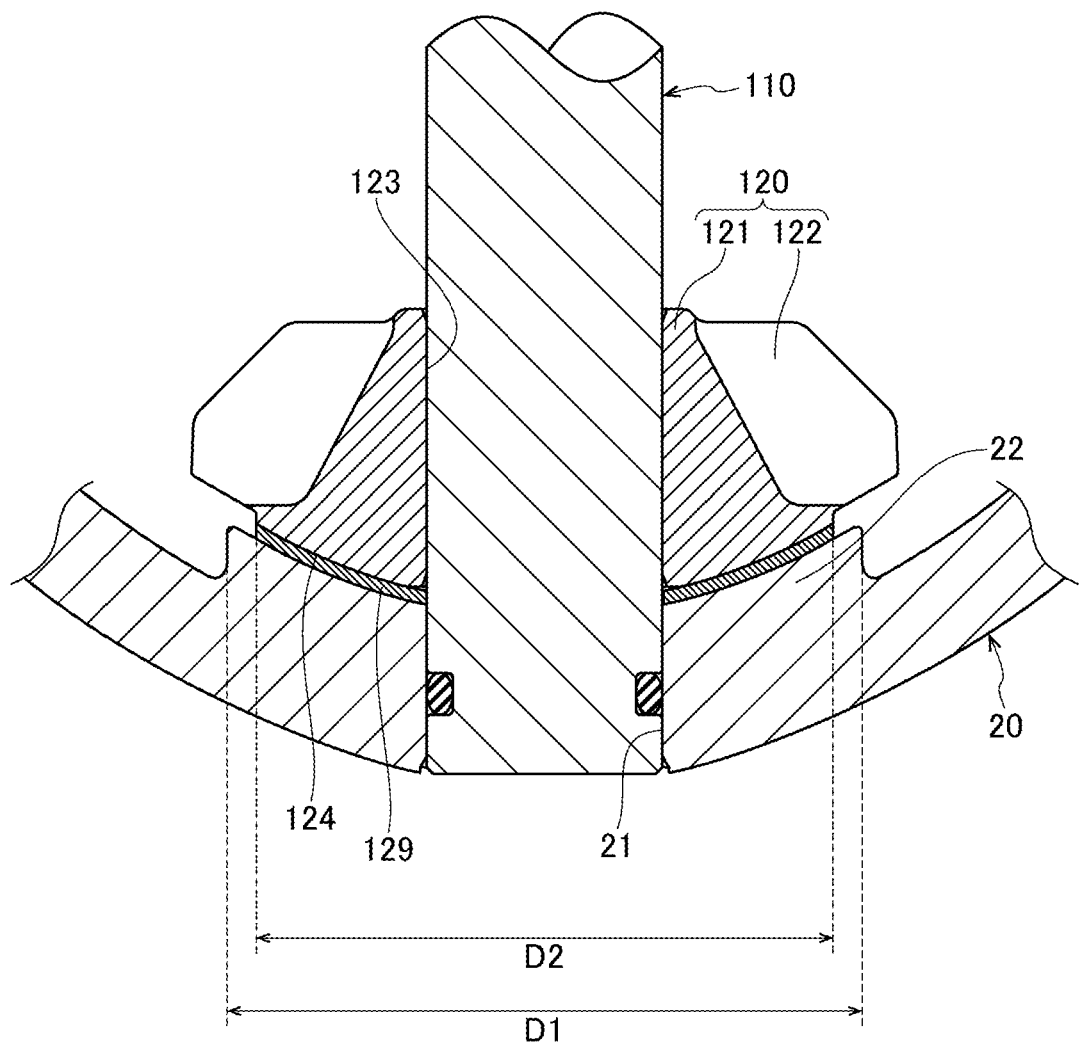
FIG. 5 is a sectional view taken along a line X2-X2 in FIG. 4.
Figure 6:
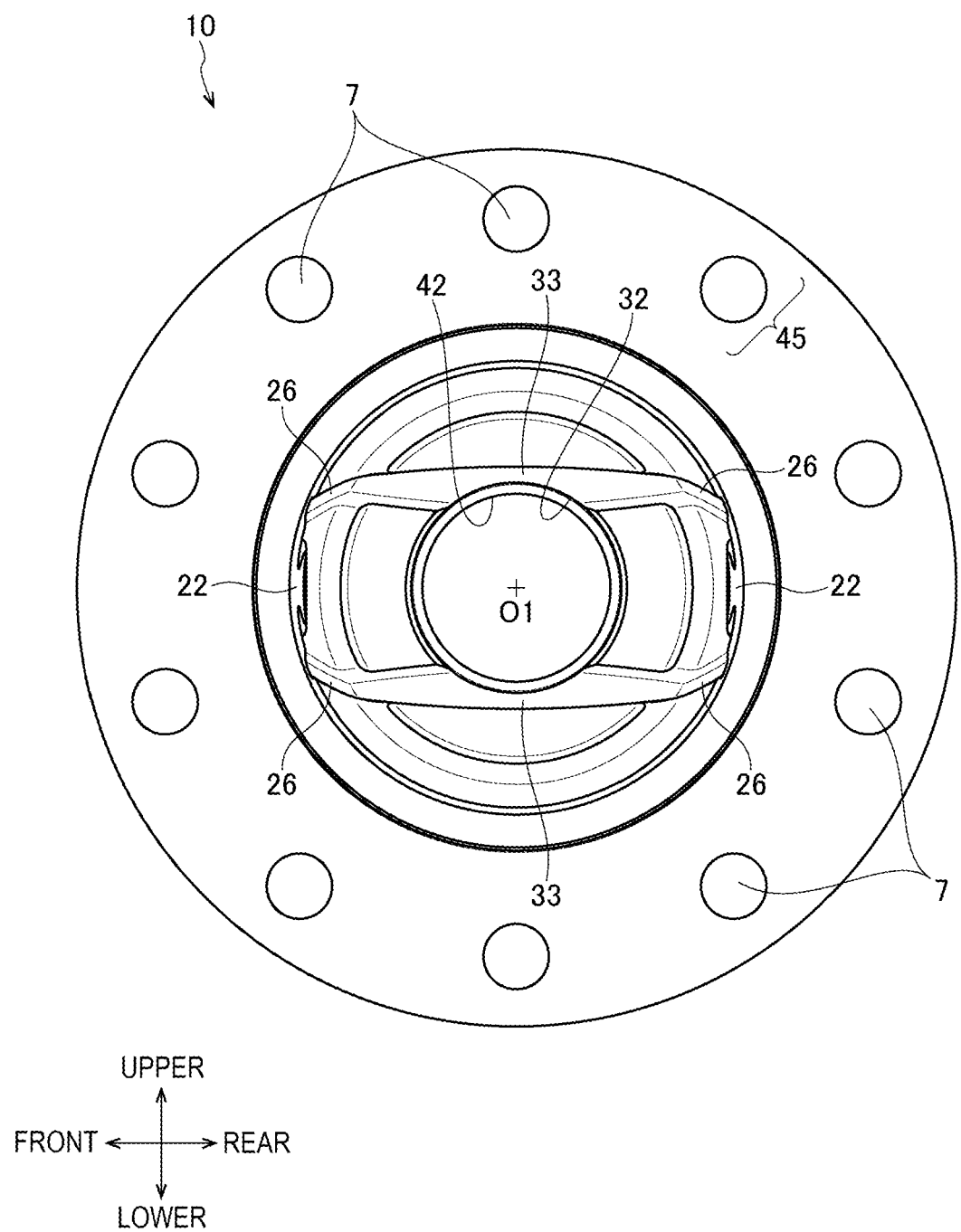
FIG. 6 is a left side view of a differential case main body according to the first embodiment.

A convex portion 22 having a cylindrical pedestal shape protruding inward is formed around the insertion hole 21 on an inner peripheral surface of the hemispherical shell-shaped portion 20 (see FIGS. 3, 4 and 5). That is, the convex portion 22 is formed on the inner peripheral surface (an inner surface) of the hemispherical shell-shaped portion 20 (the outer shell wall portion) on a back surface side of the pinion gear 120. An inner surface of the convex portion 22 is polished to reduce sliding resistance. Such a convex portion 22 can be easily formed by forming a cylindrical pedestal slightly higher than the convex portion 22 by casting, and polishing a top portion of the cylindrical pedestal.

In each convex portion 22, two first grooves 23 extending in a rotation direction and four second grooves 24 inclined with respect to the rotation direction are formed around the insertion hole 21. That is, the first grooves 23 and the second grooves 24 are grooves formed in the inner peripheral surface (the inner surface) of the hemispherical shell-shaped portion 20 (the outer shell wall portion) on the back surface side of the pinion gear 120. However, the number of the first grooves 23 and the second grooves 24 can be freely changed.

As viewed in an axial direction of the insertion hole 21, the two first grooves 23 extend in the rotation direction from the insertion hole 21 at an interval of 180°, and two second grooves 24 extend at an equal interval (an interval of 60°) between the two first grooves 23. That is, the two first grooves 23 and the four second grooves 24 extend radially around the insertion hole 21. In this way, since the first grooves 23 and the like have a radial shape, the lubricant easily flows through the entire differential case 1.

The front first grooves 23 communicate with the rear first grooves 23 via arc-shaped first communication grooves 25 extending in the rotation direction in the inner surface of the hemispherical shell-shaped portion 20. That is, the first grooves 23, the first communication groove 25, the first grooves 23 and the first communication groove 25 communicate with each other to constitute one annular groove extending in the rotation direction at a maximum inner diameter portion of the hemispherical shell-shaped portion 20 that rotates about the axis O1.

In this way, since the first grooves 23 and the first communication grooves 25 communicate with each other at the maximum inner diameter portion, the lubricant that has moved in a radially outward direction in the hemispherical shell-shaped portion 20 due to a centrifugal force during rotation of the differential case 1 is easily supplied to the first grooves 23 through the first communication grooves 25. Thereby, the lubricant is supplied to the convex portion 22, the back surface 124 of the pinion gear main body 121, and the thrust bearing 129, which are favorably lubricated. As a result, seizure of the convex portion 22, the back surface 124 of the pinion gear main body 121, and the thrust bearing 129 is prevented, and durability is enhanced.

<Size of Convex Portion>

As viewed in the axial direction of the insertion hole 21, a diameter D1 of the convex portion 22 is designed to be equal to or larger than a diameter D2 of the back surface 124 (the sliding contact portion on the back surface side) of the pinion gear main body 121 (D1≥D2, see FIG. 5). In this way, since the diameter D1 of the convex portion 22 is equal to or larger than the diameter D2 of the back surface 124 of the pinion gear main body 121, the convex portion 22 supports the pinion gear main body 121 without eccentricity or the like. The convex portion 22 is also less likely to be unevenly worn.

In a bottom wall portion 31 of the hemispherical shell-shaped portion 20, the stepped hole 32 recessed rightward in a stepped manner is formed at an opening edge of a right shaft hole 42 (see FIGS. 3 and 4). Two third grooves 33 extending in a direction orthogonal to the axis O1 with the stepped hole 32 in between are formed in the bottom wall portion 31 (see FIG. 6). That is, the third grooves 33 are grooves formed in a bottom surface (the inner surface) of the hemispherical shell-shaped portion 20 (the outer shell wall portion) on a back surface side of the side gear 130.

Figure 8:
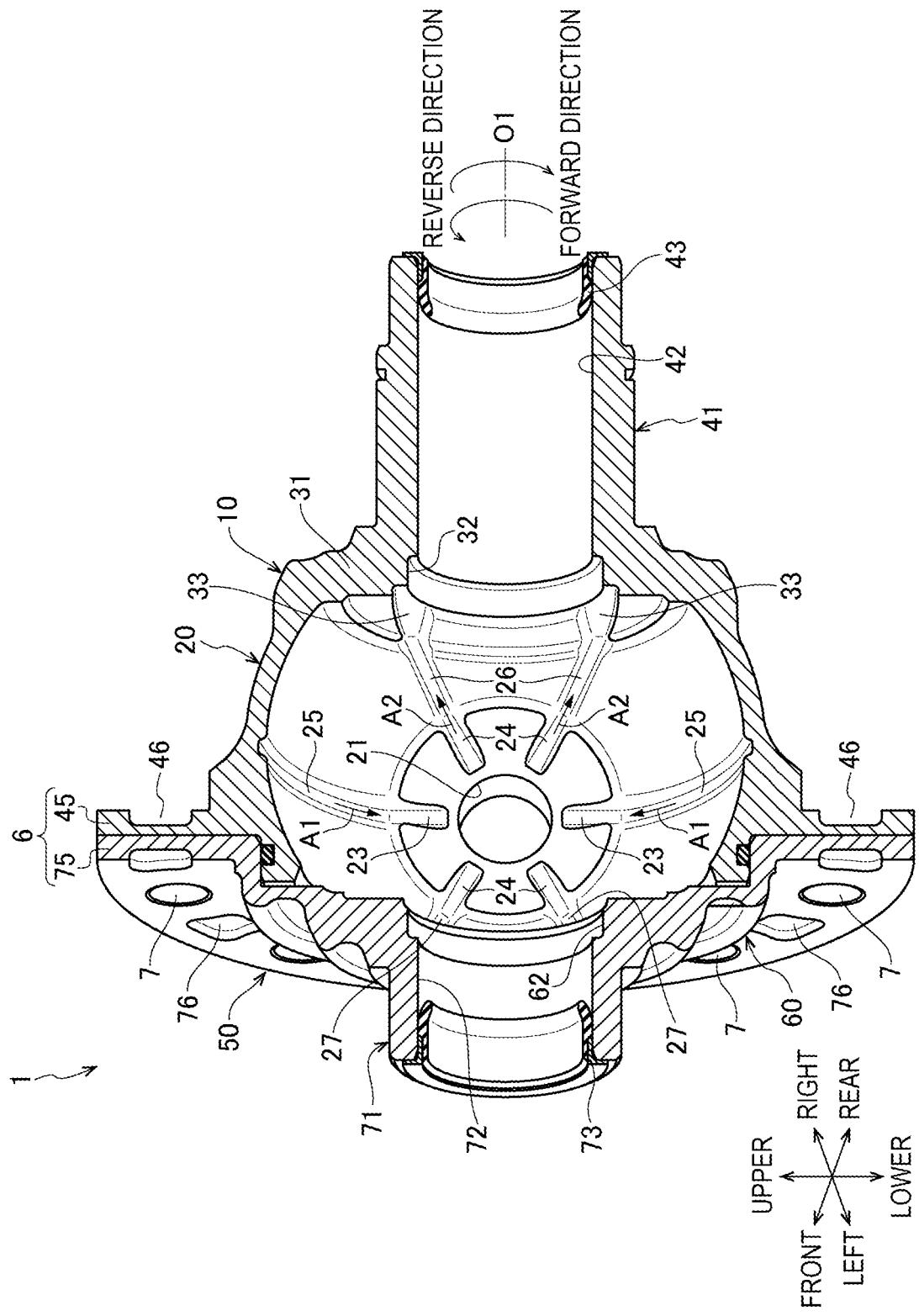
FIG. 8 is a perspective view of the differential case according to the first embodiment.

The third grooves 33 communicates with the second grooves 24 of the front or rear convex portion 22 via front and rear second communication grooves 26 formed in the inner surface of the hemispherical shell-shaped portion 20 (see FIG. 8). Thereby, a part of the lubricant collected in the convex portion 22 through the first communication grooves 25 and the first grooves 23 is supplied to the third grooves 33 through the second grooves 24 and the second communication grooves 26. Therefore, the back surface 135 of the side gear 130 and the thrust bearing 139 are favorably lubricated. As a result, seizure of the back surface 135 of the side gear 130, and the thrust bearing 139 is prevented, and durability is enhanced.

<Differential Case Main Body: Right Boss Portion>

The right shaft hole 42 through which a right drive shaft is inserted and which communicates with inside of the hemispherical shell-shaped portion 20 is formed in the right boss portion 41 (see FIGS. 3 and 4). A lubricant seal 43 is attached to a right opening of the right shaft hole 42. The lubricant seal 43 is a so-called oil seal and forms the differential case 1 in the sealed shape, whereby the internal lubricant does not flow out to the outside.

<Differential Case Main Body: Right Flange Portion>

The right flange portion 45 and a left flange portion 75 described later constitute the flange portion 6. In the right flange portion 45, a lightening hole 46 opening on the right side is formed between the bolt holes 7 adjacent to each other in the circumferential direction. This reduces a weight of the right flange portion 45.

<Differential Case Lid>

The differential case lid 50 is a member that closes a left opening of the differential case main body 10. The differential case lid 50 includes a thick disk-shaped lid main body 60, a cylindrical left boss portion 71 extending leftward from a center of the lid main body 60, and a ring-shaped left flange portion 75 extending radially outward from an outer peripheral edge of the lid main body 60.

<Differential Case Lid: Lid Main Body>

A left shaft hole 72 opens at the center of the lid main body 60. The stepped hole 62 recessed leftward in a stepped manner is formed at an opening edge of the left shaft hole 72 (see FIGS. 3 and 4). Two fourth grooves 63 extending in the direction orthogonal to the axis O1 with the stepped hole 62 in between are formed in an inner surface of the lid main body 60 (see FIG. 7). That is, the fourth grooves 63 are grooves formed in the inner surface of the lid main body 60 (the outer shell wall portion) on the back surface side of the side gear 130.

Figure 9:
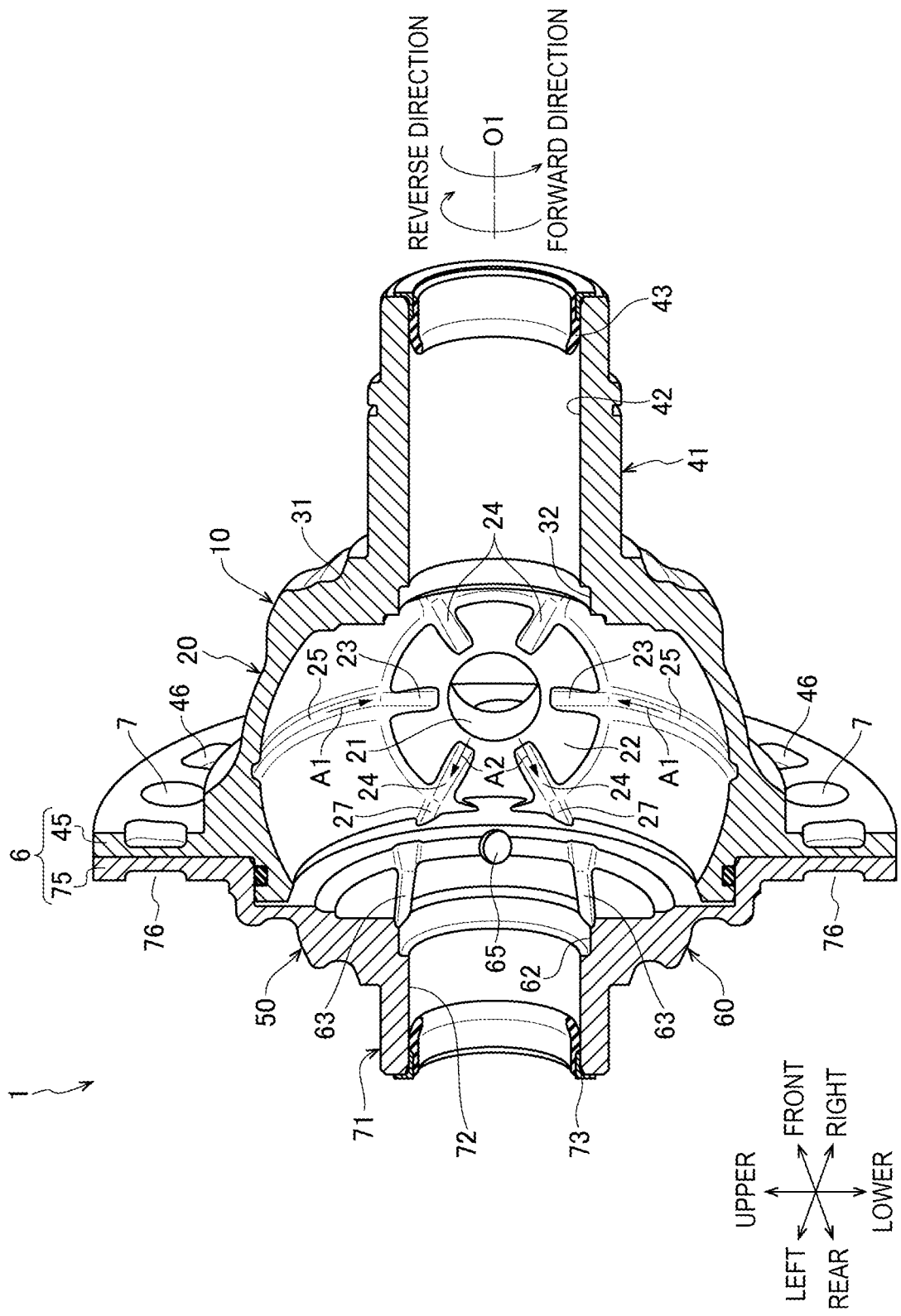
FIG. 9 is a perspective view of the differential case according to the first embodiment.

The fourth grooves 63 communicate with the second grooves 24 of the convex portion 22 via front and rear third communication grooves 27 formed in the inner surface of the hemispherical shell-shaped portion 20 (see FIG. 9). Thereby, a part of the lubricant collected in the convex portion 22 through the first communication grooves 25 and the first grooves 23 is supplied to the fourth grooves 63 through the second grooves 24 and the third communication grooves 27. Therefore, the back surface 135 of the left side gear 130 and the thrust bearing 139 are favorably lubricated. As a result, seizure of the back surface 135 of the left side gear 130 and the thrust bearing 139 is prevented, and durability is enhanced.

An injection hole 65 for injecting the lubricant into the differential case 1 and a discharge hole 66 for discharging the lubricant from the differential case 1 are formed in the lid main body 60 (see FIGS. 3 and 7). A bolt 91 is screwed into the injection hole 65, and A set screw 92 with a hexagon socket is screwed into the discharge hole 66.

<Differential Case Lid: Left Boss Portion>

The left shaft hole 72 through which a left drive shaft is inserted and which communicates with the inside of the hemispherical shell-shaped portion 20 is formed in the left boss portion 71. A lubricant seal 73 that is in sliding contact with the left drive shaft is attached to a left opening of the left shaft hole 72. The lubricant seal 73 is a so-called oil seal and forms the differential case 1 in the sealed shape.

<Differential Case Main Body: Left Flange Portion>

In the left flange portion 75, a lightening hole 76 opening on a left side is formed between the bolt holes 7 adjacent to each other in the circumferential direction. This reduces a weight of the left flange portion 75. In the left-right direction, the lightening hole 76 is formed shallower than the lightening hole 46.

[Operational Effects of Differential Case]

Operational effects of the differential case 1 will be described.

When the differential case 1 rotates, the centrifugal force acts on the lubricant, and the lubricant is supplied to the back surface side of the pinion gear 120 through the first communication grooves 25 and the first grooves 23 having a maximum inner diameter in the differential case 1 (see arrows A1 in FIGS. 8 and 9). The lubricant favorably lubricates the back surface 124 of the pinion gear 120, the thrust bearing 129 and the convex portion 22, prevents seizure of the back surface 124 and the like, and improves durability. On the other hand, when the first grooves 23 and the like are not formed as in related art, the lubricant is difficult to be supplied to the back surface side of the pinion gear 120.

A part of the lubricant collected in the convex portion 22 is supplied to the third grooves 33 on the back surface side of the right side gear 130 through the second grooves 24 and the second communication grooves 26 (see arrows A2 in FIG. 8). Thereby, the back surface 135 of the right side gear 130 and the thrust bearing 139 are favorably lubricated, seizure of the back surface 135 and the like is prevented, and durability is enhanced. On the other hand, when the second grooves 24, the second communication grooves 26 and the third grooves 33 are not formed as in the related art, the lubricant is difficult to be supplied to the back surface side of the side gear 130.

A part of the lubricant is supplied to the fourth grooves 63 on the back surface side of the left side gear 130 through the second grooves 24 and the third communication grooves 27 (see arrows A2 in FIG. 9). Thereby, the back surface 135 of the left side gear 130 and the thrust bearing 139 are favorably lubricated, seizure of the back surface 135 and the like is prevented, and durability is enhanced.

Although one embodiment of the present invention has been described above, the present invention is not limited thereto, and may be changed as follows, or may be appropriately combined with a configuration according to the embodiment described later.

In the above-described embodiment, a configuration in which the convex portion 22 is formed on the inner surface of the hemispherical shell-shaped portion 20, and the first grooves 23 and the second grooves 24 are formed in the convex portion 22 has been exemplified. However, for example, the hemispherical shell-shaped portion 20 may not have the convex portion 22, and the first grooves 23 and the second grooves 24 may be formed around the insertion hole 21.

In the above-described embodiment, a configuration in which the convex portion 22 has a cylindrical shape has been exemplified. However, for example, the convex portion 22 may have a quadrangular prism shape, a pentagonal prism shape, a hexagonal prism shape or an octagonal prism shape. The convex portion 22 may have a ring shape as viewed in the axial direction of the insertion hole 21, that is, a cylindrical shape centered on the insertion hole 21. In this case, the rib-shaped and arc-shaped ring that is the convex portion may be a double ring, a triple ring or the like.

In the above-described embodiment, a case where the differential case 1 has a two-piece configuration including the differential case main body 10 and the differential case lid 50 has been exemplified. However, for example, a three-piece configuration may be used.

In the above-described embodiment, a configuration in which the second grooves 24 on the back surface side of the pinion gear 120, and the third grooves 33 and the fourth grooves 63 on the back surface side of the side gear 130 communicate with each other via the second communication grooves 26 and the third communication grooves 27 having a concave shape has been exemplified. However, for example, the second grooves 24, and the third grooves 33 and the fourth grooves 63 may communicate with each other by forming an elongated rib protruding radially inward slightly behind a portion corresponding to the groove and blocking the lubricant by this rib when the differential case 1 rotates forward, without forming the groove.

In the above-described embodiment, a configuration in which the driven pulley 210 is fixed to the differential case 1 via the holder 220, and the power of the belt is transmitted to the differential case 1 via the driven pulley 210 has been exemplified. However, for example, a driven sprocket may be fixed to the differential case 1, and power of a chain may be transmitted to the differential case 1. A large-diameter ring gear may be fixed to the differential case 1, and a drive pinion gear may mesh with the ring gear.

Second Embodiment

Figure 10:
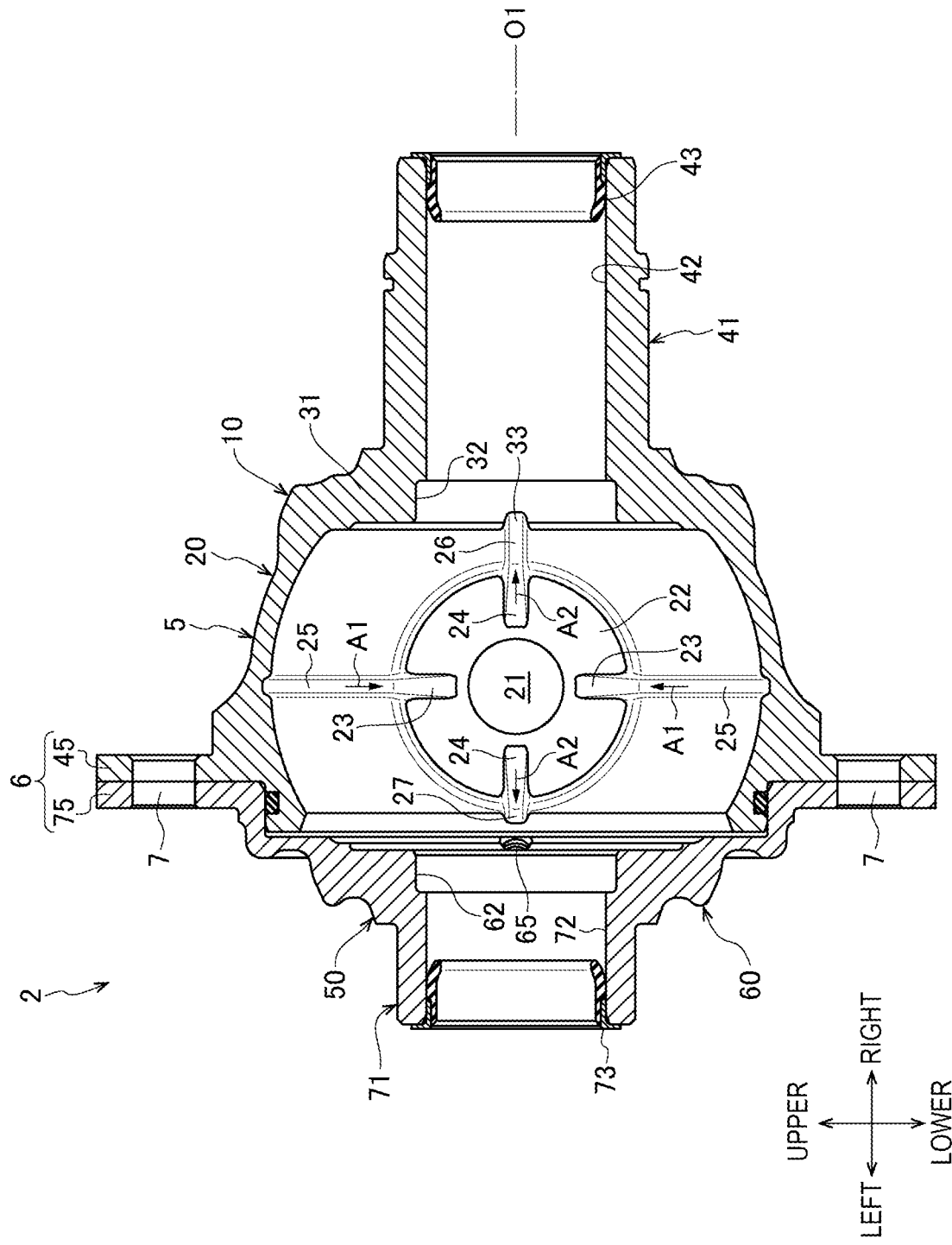
FIG. 10 is a vertical sectional view of a differential case according to a second embodiment.
Figure 11:
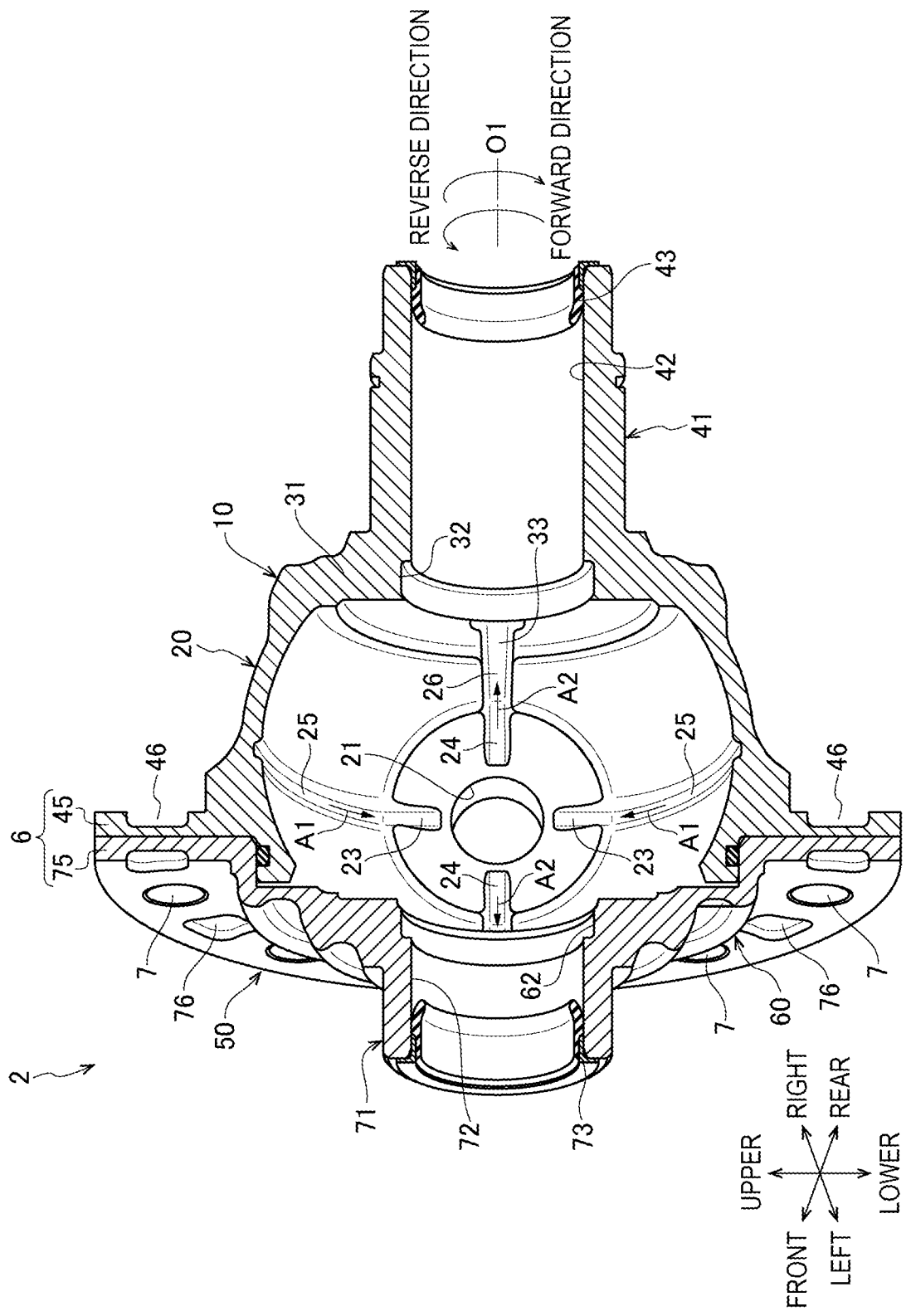
FIG. 11 is a perspective view of the differential case according to the second embodiment.

A second embodiment of the present invention will be described with reference to FIG. 10 to 11. In a differential case 2 according to the second embodiment, two second grooves 24 are formed in each convex portion 22, one third groove 33 is formed in the bottom wall portion 31, and one fourth groove 63 is formed in the lid main body 60. As viewed in the axial direction of the insertion hole 21, the second grooves 24 extend in a direction orthogonal to the first grooves. The third groove 33 and the fourth groove 63 extend parallel to the pinion shaft 110.

In this way, even in a configuration in which the two second grooves 24 are formed in each convex portion 22, a part of the lubricant collected in the convex portion 22 through the first grooves 23 is supplied to the third groove 33 or the fourth groove 63 through the second grooves 24 and the second communication groove 26. That is, the number of the second grooves 24 may be appropriately changed based on an amount of the lubricant, a degree of lubrication of the side gear 130, and the like.

Third Embodiment

Figure 12:
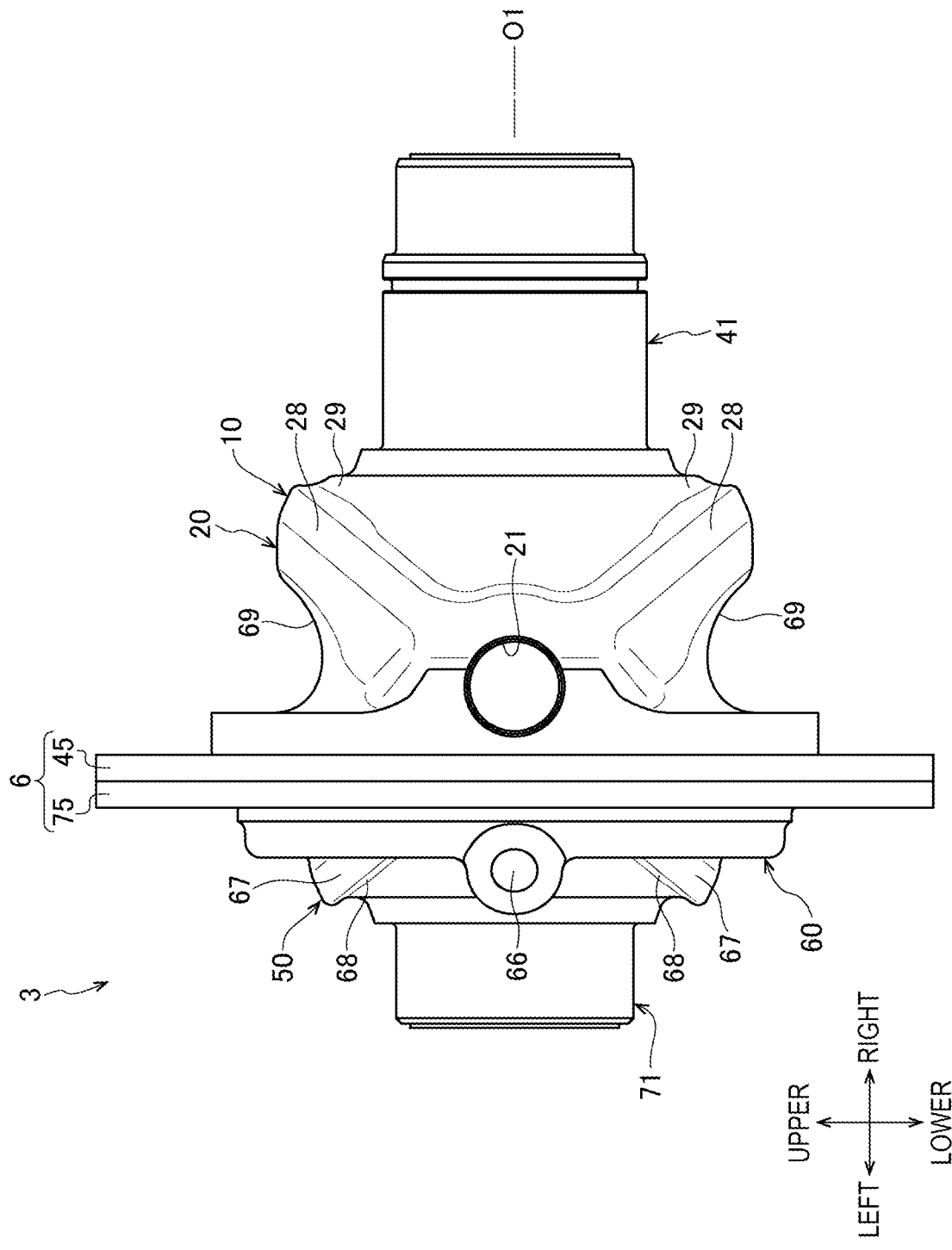
FIG. 12 is a rear view of a differential case according to a third embodiment.

A third embodiment of the present invention will be described with reference to FIG. 12.

A differential case 3 according to the third embodiment is an open type in which the lubricant flows inside and outside the case. Specifically, two window portions 69 that allow the inside and the outside of the differential case 3 to communicate with each other are formed in the lid main body 60 of the differential case lid 50. Thereby, for example, the lubricant scraped up by the rotating differential case 3 flows into the differential case 3 through the window portions 69. Accordingly, the lubricant in the differential case 3 is replaced, and the lubricant that has flowed out can be cleaned by a lubricant filter or the like.

Two first ribs 28, 28 are formed to protrude from an outer peripheral surface of the hemispherical shell-shaped portion 20 constituting the differential case main body 10. Each first rib 28 is an arc-shaped rib extending from the front insertion hole 21 to the rear insertion hole 21 via a shoulder portion 29 of the hemispherical shell-shaped portion 20. The two first ribs 28, 28 are symmetrical with respect to the axis O1 so as not to eccentrically rotate, extend diagonally upward to the right and diagonally downward to the right from the front insertion hole 21 in a front view, and form an angle of approximately 45° with a horizontal plane in FIG. 12. Each first rib 28 is formed to be thicker than other portions of the hemispherical shell-shaped portion 20, and other portions are formed to be thinner. Thereby, a weight of the differential case main body 10 is reduced while strength thereof is increased.

Similarly, two second ribs 67, 67 are formed to protrude from an outer peripheral surface of the lid main body 60 constituting the differential case lid 50. Each second rib 67 is an arc-shaped rib extending from the front insertion hole 21 to the rear insertion hole 21 via a shoulder portion 68 of the lid main body 60 with the large-diameter flange portion 6 in between. The two second ribs 67, 67 are symmetrical with respect to the axis O1 so as not to eccentrically rotate, extend diagonally upward to the left and diagonally downward to the left from the front insertion hole 21 in the front view, and form an angle of approximately 45° with the horizontal plane in FIG. 12. That is, the two first ribs 28, 28 and the two second ribs 67, 67 extend radially a substantially equal interval with the insertion hole 21 as a reference center in the front view. Each second rib 67 is formed to be thicker than other portions of the lid main body 60, and other portions are formed to be thinner.

In this way, the two first ribs 28, 28, the two second ribs 67, 67, and the large-diameter flange portion 6 are formed on the entire outer peripheral surface of the outer shell wall portion 5 (the differential case 3) around the insertion hole 21 into which the pinion shaft 110 is inserted. Thereby, stress is not concentrated on a part between the differential case 3 and the pinion shaft 110, but is distributed throughout the differential case 3.

What is claimed is:

1. A differential case comprising:
   an outer shell wall portion configured to accommodate a pinion gear therein,
   wherein a first groove extending in a rotation direction about an axis serving as a rotation center of the differential case is formed in an inner surface of the outer shell wall portion on a back surface side of the pinion gear.
2. The differential case according to claim 1,
   wherein the outer shell wall portion accommodates a plurality of the pinion gears,
   wherein the first groove is formed in the inner surface of the outer shell wall portion on a back surface side of each of the pinion gears, and
   wherein a first communication passage is formed in the inner surface of the outer shell wall portion, the first communication passage extending in the rotation direction about the axis and allowing the plurality of first grooves to communicate with each other.
3. The differential case according to claim 1,
   wherein a convex portion is formed on the inner surface of the outer shell wall portion on the back surface side of the pinion gear, and
   wherein the first groove is formed in the convex portion.
4. The differential case according to claim 3,
   wherein a diameter of the convex portion is equal to or larger than a diameter of a sliding contact portion of the pinion gear on the back surface side.
5. The differential case according to claim 4,
   wherein the sliding contact portion protrudes to the back surface side with respect to pinion gear teeth of the pinion gear.
6. The differential case according to claim 1,
   wherein the outer shell wall portion further accommodates therein a side gear configured to mesh with the pinion gear,
   wherein a second groove extending toward the side gear is formed in the inner surface of the outer shell wall portion on the back surface side of the pinion gear,
   wherein a third groove is formed in the inner surface of the outer shell wall portion on a back surface side of the side gear, and
   wherein a second communication passage allowing the second groove and the third groove to communicate with each other is formed in the inner surface of the outer shell wall portion.
7. The differential case according to claim 6,
   wherein the first groove and the second groove radially extend around the pinion gear on the back surface side of the pinion gear.
8. The differential case according to claim 1,
   wherein the differential case has a sealed shape in which a lubricant therein is sealed so as not to flow out to outside.
9. The differential case according to claim 1,
   wherein a plurality of ribs extending in an arc shape between two insertion holes into which a pinion shaft is inserted are formed to protrude from an outer peripheral surface of the outer shell wall portion.
10. The differential case according to claim 2,
    wherein a convex portion is formed on the inner surface of the outer shell wall portion on the back surface side of the pinion gear, and
    wherein the first groove is formed in the convex portion.
11. The differential case according to claim 10,
    wherein a diameter of the convex portion is equal to or larger than a diameter of a sliding contact portion of the pinion gear on the back surface side.
12. The differential case according to claim 11,
    wherein the sliding contact portion protrudes to the back surface side with respect to pinion gear teeth of the pinion gear.
13. The differential case according to claim 2,
    wherein the outer shell wall portion further accommodates therein a side gear configured to mesh with the pinion gear,
    wherein a second groove extending toward the side gear is formed in the inner surface of the outer shell wall portion on the back surface side of the pinion gear,
    wherein a third groove is formed in the inner surface of the outer shell wall portion on a back surface side of the side gear, and
    wherein a second communication passage allowing the second groove and the third groove to communicate with each other is formed in the inner surface of the outer shell wall portion.
14. The differential case according to claim 13,
    wherein the first groove and the second groove radially extend around the pinion gear on the back surface side of the pinion gear.
15. The differential case according to claim 2,
    wherein the differential case has a sealed shape in which a lubricant therein is sealed so as not to flow out to outside.
16. The differential case according to claim 2,
    wherein a plurality of ribs extending in an arc shape between two insertion holes into which a pinion shaft is inserted are formed to protrude from an outer peripheral surface of the outer shell wall portion.
17. The differential case according to claim 3,
    wherein the outer shell wall portion further accommodates therein a side gear configured to mesh with the pinion gear,
    wherein a second groove extending toward the side gear is formed in the inner surface of the outer shell wall portion on the back surface side of the pinion gear, wherein a third groove is formed in the inner surface of the outer shell wall portion on a back surface side of the side gear, and wherein a second communication passage allowing the second groove and the third groove to communicate with each other is formed in the inner surface of the outer shell wall portion.

18. The differential case according to claim 17, wherein the first groove and the second groove radially extend around the pinion gear on the back surface side of the pinion gear.

19. The differential case according to claim 3, wherein the differential case has a sealed shape in which a lubricant therein is sealed so as not to flow out to outside.

20. The differential case according to claim 3, wherein a plurality of ribs extending in an arc shape between two insertion holes into which a pinion shaft is inserted are formed to protrude from an outer peripheral surface of the outer shell wall portion.

* * * * *